Oct. 14, 1958 E. JANOWSKI 2,856,324
METHOD OF MANUFACTURING VENETIAN BLIND LADDER TAPE
Filed Sept. 17, 1957 2 Sheets-Sheet 1

INVENTOR.
Edward Janowski
BY
Albert P. Davis
ATTORNEY

Oct. 14, 1958 E. JANOWSKI 2,856,324
METHOD OF MANUFACTURING VENETIAN BLIND LADDER TAPE
Filed Sept. 17, 1957 2 Sheets-Sheet 2
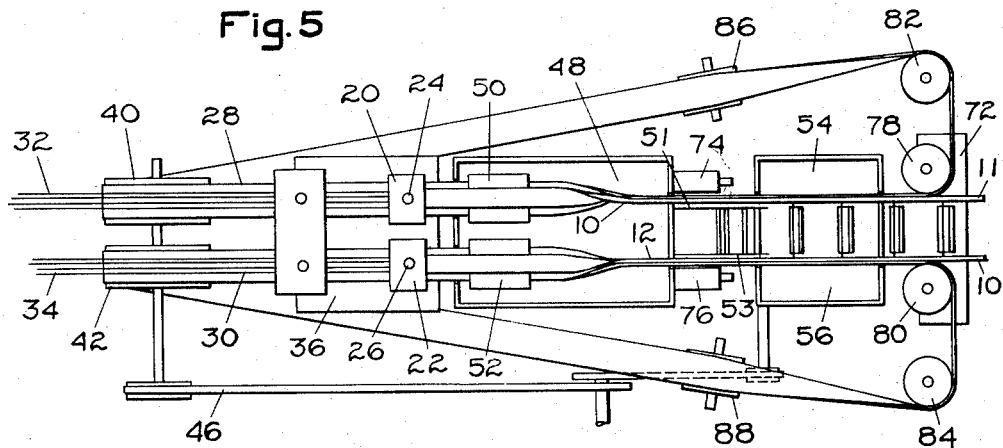
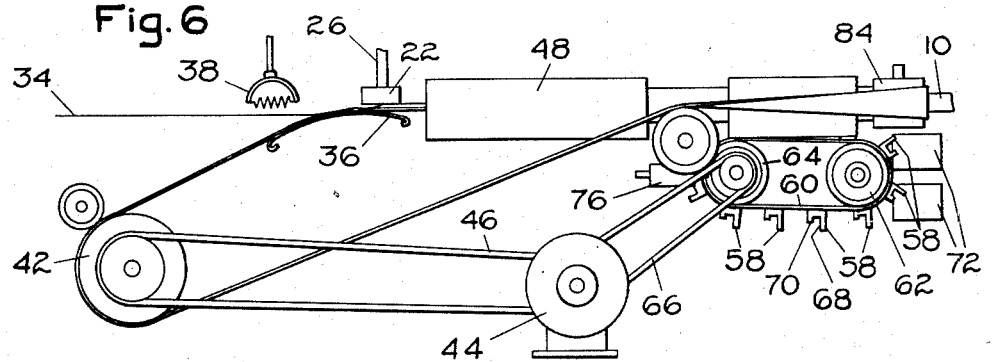
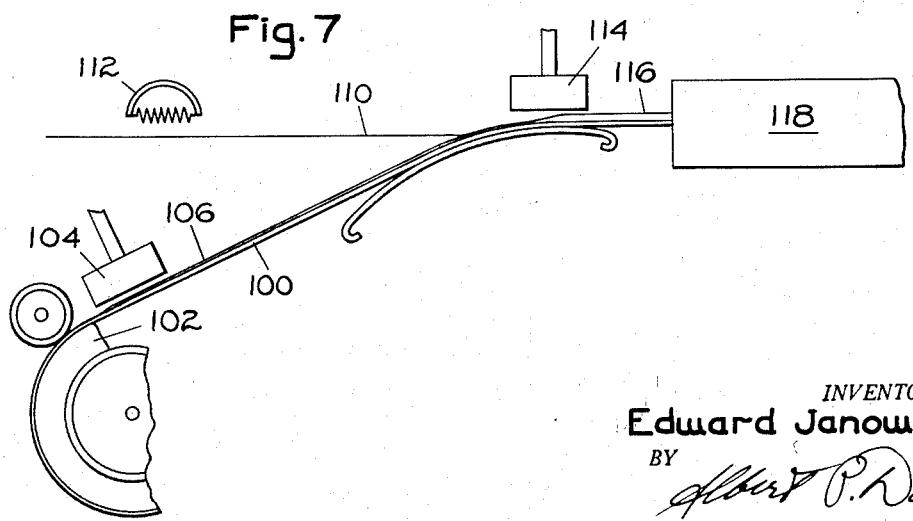
INVENTOR.
Edward Janowski
BY
ATTORNEY United States Patent Office 2,856,324
Patented Oct. 14, 1958

2,856,324
METHOD OF MANUFACTURING VENETIAN BLIND LADDER TAPE

Edward Janowski, Pawtucket, R. I.

Application September 17, 1957, Serial No. 684,570

8 Claims. (Cl. 154—118)

The present invention is a continuation-in-part of my copending application, Serial No. 225,187, filed May 8, 1951, for Method of Manufacturing Venetian Blind Ladder Tape, now abandoned, and of my copending application Serial No. 546,910, filed November 15, 1955, now abandoned, and relates to a method of manufacturing Venetian blind ladder tape, and more particularly relates to a method of manufacturing plastic non-self-supporting Venetian blind ladder tape.

One object of the present invention is to provide a method of manufacturing a plastic Venetian blind ladder tape.

Another object of the present invention is to provide a method of manufacturing a reinforced plastic Venetian blind ladder tape.

Another object of the present invention is to provide a method of manufacturing a plastic Venetian blind ladder tape wherein the side tapes are cast continuously.

Another object of the present invention is to provide a method of manufacturing a plastic Venetian blind ladder tape wherein the side tapes are cast from uncured plastic and the rung ends are pressed into contact therewith and the plastic cured.

Another object of the present invention is to provide a method of manufacturing a plastic Venetian blind ladder tape wherein the side tapes are cast from uncured plastic and the rung ends are embedded therein and the plastic cured.

Another object of the present invention is to provide a method of manufacturing a plastic Venetian blind ladder tape wherein a fluid uncured plastic of the plastisol type is cast upon a pair of moving molding surfaces to form a pair of side tapes and the ends of the rung tapes are embedded in said side tapes prior to the time they are completely cured.

Another object of the present invention is to provide a method of manufacturing a plastic Venetian blind ladder tape wherein a plastic material is cast upon a pair of moving molding surfaces and around a plurality of reinforcing fibers to form a pair of side tapes and the ends of the rung tapes to form a pair of side tapes and the ends of the rung tapes are embedded in said side tapes prior to the time they are completely cured.

Other objects of the invention will in part appear hereinafter.

The invention accordingly comprises the method possessing the steps, and the relation of the steps to each other which are exemplified in the following detailed disclosure, and the scope of the application of which will be indicated in the claims.

For a fuller understanding of the nature and objects of the invention, reference should be had to the following detailed description taken in connection with the accompanying drawing wherein:

Fig. 5 is a diagrammatic plan view of one form of apparatus adapted to carry out the method of the present invention;

Fig. 6 is a side elevation thereof; and

Fig. 7 is a fragmentary diagrammatic side elevation disclosing a modification wherein the side tapes are cast in two steps.

The present invention comprises a method of continuously manufacturing plastic Venetian blind ladder tape having reinforcing strands embedded in the side tapes to strengthen them and to permit them to resist stretching when fabricated into a Venetian blind.

The method of the present invention comprises the steps of continuously and simultaneously casting uncured fluid plastic material over a plurality of stretch limiting reinforcing cords that have been thoroughly dried and on two parallel moving molding surfaces that are moving in the same direction at the same speed and in substantially the same plane to form two uncured side tapes. The cast plastic on the moving molding surfaces is then partially cured and each molding surface and the partially cured plastic tape carried thereby is rotated through substantially ninety degrees to bring the partially cured side tapes back-to-back and spaced apart a predetermined distance equal to the spacing of the side tapes in the finished ladder tape to permit the insertion of the rung tapes therebetween. The rung tapes are then inserted between the partially cured side tapes to bend the ends of said rungs back against the back surfaces of each side tape and to cause said bent ends to become partially embedded in the soft partially cured plastic of said side tapes. Following this the curing of the plastic forming the side tapes is completed to bond the rung ends thereto and the completed Venetian blind ladder tape is stripped from the two molding surfaces. Alternatively, the foregoing process may be carried out without partially curing the uncured plastic prior to rotating the molding surfaces ninety degrees. The latter modification may be carried out merely by employing one of the uncured plastics which have been commercially available for several years that has a high viscosity and will not flow from the molding surfaces when these surfaces are rotated ninety degrees to a substantially vertical position.

Figure 1:
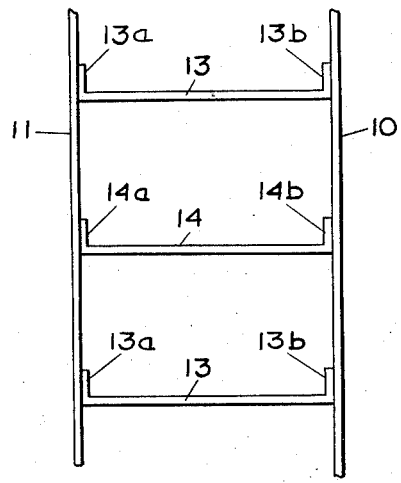
Figure 1 is a side elevation of a fragment of Venetian blind ladder tape made in accordance with the present invention.
Figure 2:
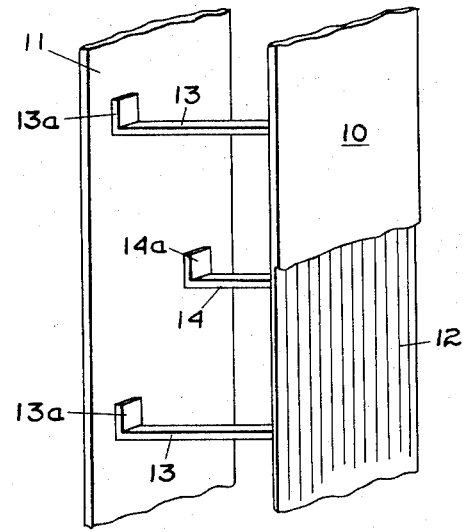
Fig. 2 is a perspective view thereof with parts broken away to show the construction of the side tapes.

Referring now to Figs. 1 and 2 of the drawing there is shown a Venetian blind ladder tape made in accordance with the method of the present invention. The ladder tape comprises a pair of parallel plastic side tapes 10 and 11 each having embedded therein a plurality of parallel stretch limiting and reinforcing cords or fibers 12 extending longitudinally of each of said side tapes at approximately their midpoint. Cords 12 may be any small diameter filamentary material possessing sufficient tensile strength to prevent side tapes 10 and 11 from stretching under the weight of a completed Venetian blind. For example, cords 12 may be rayon, nylon, Orlon, cotton, linen, etc., or they can be fine gage wire.

A plurality of alternately staggered spaced apart plastic rung tapes 13 and 14 are located between side tapes 10 and 11 to provide two spaced rows of rung tapes adapted to support the blind slats in a well known manner in the completed Venetian blind. Both ends of the rungs 13 and 14 are bent to the same side of the rung to provide bent up rung ends 13a and 13b on the rungs 13 and 14a and 14b on rungs 14. The bent up rung ends 13a, 13b, 14a and 14b are embedded a slight amount in the back surfaces of the side tapes 13 and 14 and are bonded therein to form a unitary structure.

Figure 3:
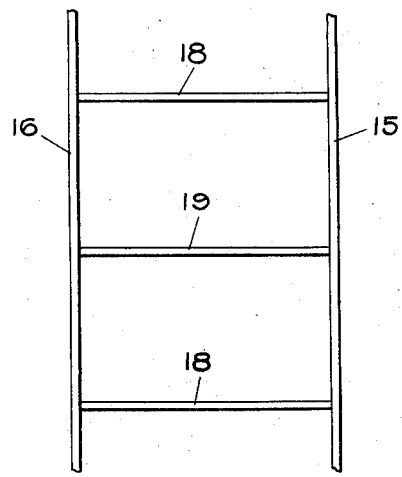
Fig. 3 is a side elevation of a Venetian blind ladder tape made in accordance with a modification of my invention.
Figure 4:
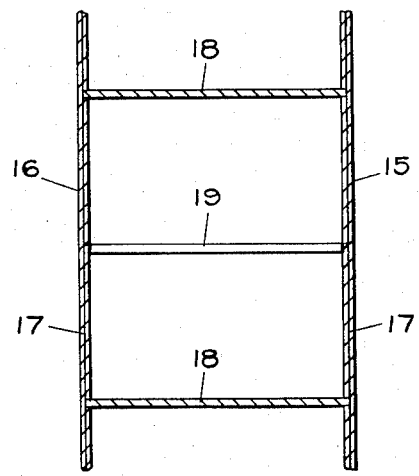
Fig. 4 is a sectional view of the tape disclosed in Fig. 3 showing the manner in which the rung ends are attached to the side tape.

Figs. 3 and 4 illustrate a plastic Venetian blind ladder tape generally similar to the ladder tape illustrated in Figs. 1 and 2 but differing therefrom in the manner in which the ends of the rung tapes are attached to the side tapes. The ladder tape of Figs. 3 and 4 comprises a pair of parallel plastic side tapes 15 and 16 each having embedded therein a plurality of parallel stretch resistant cords 17. A plurality of alternately staggered spaced apart plastic rung tapes 18 and 19 are located between side tapes 15 and 16 to provide two spaced rows of rung tapes. Each end of the rung tapes is embedded in its respective side tape to substantially the depth of the stretch resistant cords 17 and are bonded therein to form a unitary structure.

The method of the present invention is illustrated diagrammatically in Figs. 5 and 6. An uncured fluid thermoplastic plastic is supplied to a pair of metering orifices 20 and 22 by means of a pair of pipes 24 and 26 respectively. Metering orifices 20 and 22 are located above a pair of metallic belts 28 and 30 respectively in position to discharge fluid plastic material at a predetermined rate onto the surface of each of said belts. A plurality of parallel reinforcing cords 32 extend from a source of supply, not shown, which can be a warp or a creel on to the surface of belt 28. A plurality of similar reinforcing cords 34 extend on to belt 30.

One surface of each belt 28 and 30 forms a molding surface adapted to provide any desired finish or texture to the completed side tapes. For example, the molding surface can be smooth or it can be embossed to impart a woven appearance to the side tape or a texture simulating leather. Belts 28 and 30 can be of considerable length and be wound from one spool or reel to another during the manufacture of the ladder tape. However, it is preferred to employ two metallic belts that are formed into loops or endless belts which pass around pulleys in a manner to be explained hereinafter to make possible the manufacture of ladder tape of indefinite length.

Metallic belts 28 and 30 are supported parallel to each other with their molding surfaces facing upwardly and in the same plane by a curved guide member 36. Reinforcing cords 32 and 34 extend from their source of supply and pass under heating means 38 which removes all moisture from the cords 32 and 34 to thereby prevent the formation of steam from moisture in the cords when heat is applied to the plastic to cure it. Steam generated when the plastic is cured causes bubbles to form in the plastic. After being completely dried by heating means 38 cords 32 and 34 contact the molding surfaces of belts 28 and 30 ahead of orifices 20 and 22. Belts 28 and 30 are moved under orifices 20 and 22 at a uniform rate of speed by means of driving pulleys 40 and 42 around which said belts pass. Pulleys 40 and 42 can be rotated by any convenient means as, for example, motor 44 and belt 46.

As metallic belts 28 and 30 and reinforcing cords 32 and 34 pass under their respective metering orifices 20 and 22 a predetermined quantity of uncured fluid thermoplastic plastic material is spread over said cords and on to the surfaces of belts 28 and 30. The width of the cast layer of plastic is equal to the desired width of the finished side tapes. Any convenient thermo-plastic plastic having the requisite characteristics of flexibility, resistance to deterioration on exposure to sunlight, and sufficient mechanical strength can be used.

*Example I*

It has been found that a plastic of the plastisol type, and comprising 100 parts of polyvinyl chloride sold under the trade name of Geon resin 121 and manufactured by the B. F. Goodrich Chemical Company; 30 parts of plasticizer such as di-octyl phthalate sold under the trade name Goodrich Plasticizer GP-261 and manufactured by the B. F. Goodrich Chemical Company; 30 parts of di-octyl sebacate, manufactured by Rohm and Haas; plus suitable pigments works satisfactorily with the present invention.

After a layer of plastic material has been cast on belts 28 and 30 said belts together with cords 32 and 34 pass into a preliminary curing oven 48. Immediately upon entering oven 48 the edges of both belts 28 and 30 are gripped by guiding means 50 and 52 which hold said belts smooth and incline them upwardly a small amount to cause cords 32 and 34, which are under a predetermined tension, to pull up from the molding surfaces of said belts into the middle of the layer of plastic. By the time the belts pass out of guides 50 and 52 the plastic has set sufficiently to prevent further movement of the cords. After the belts leave guides 50 and 52 they are each twisted through substantially ninety degrees to bring the exposed surfaces of the two strips of partially cured plastic face-to-face and spaced apart the distance it is desired to have the side tapes spaced in the finished ladder tape.

The partially cured side tapes, carried by belts 28 and 30 leave the preliminary curing oven 48 and rung tapes 13 and 14, having a length greater than the spacing between said partially cured side tapes, are moved into position between said side tapes while being held perpendicular thereto. Means are provided, preferably in the form of a pair of thin plates 51 and 53 located between and closely adjacent the surfaces of the partly cured tapes, to engage the ends of the rung tapes, as they move between the side tapes, and bend them back and at the same time hold the rung ends out of contact with the partly cured plastic until they are properly located, relative to the side tapes, to prevent said ends from smearing the soft plastic. When the rungs 13 and 14 are properly positioned between the side tapes they pass from between plates 51 and 53 and contact the partly cured side tapes. Moving the rung tapes between the side tapes in this manner causes the ends thereof to be bent back to the same side of the rung and in contact with the inner or exposed surfaces of the partially cured side tapes. Holding the rung tapes thus positioned as the side tapes and belts 28 and 30 continue to advance permits the bent over rung ends to embed themselves a slight amount in said side tapes.

After the rung tapes 13 and 14 have been positioned between side tapes 10 and 11 belts 28 and 30 pass across the open faces of final curing ovens 54 and 56 respectively to heat said belts and thereby apply heat to the side tapes 10 and 11 to effect their complete curing and to bond the ends of the rung tapes 13 and 14 thereto.

Rung tapes 13 and 14 can be positioned between side tapes 10 and 11 in any convenient manner but it is preferred to employ a plurality of identical jigs 58 equally spaced along an endless chain 60 which in turn is driven by a pair of sprocket wheels 62 and 64. Sprocket wheel 64 can be driven by motor 44 by means of belt 66. Each jig 58 preferably is similar to the jig described and claimed in Patent No. 2,642,918, issued to me June 23, 1953. Each jig is provided with a relatively long arm 68 and a relatively short arm 70 which function to stagger rungs 13 and 14 inasmuch as the difference in the length of said arms is equal to the lateral spacing, or stagger, between said runs. The spacing between arm 68 and 70 of each jig is equal to the spacing between adjacent rung tapes 13 and 14 in the finished ladder tape. Also the spacing between arm 70 of one jig and the arm 68 of the adjacent jig is equal to the spacing between adjacent rung tapes 13 and 14 in the finished ladder tape.

Chain 60 is driven at a lineal speed equal to the speed at which belts 28 and 30 travel and sprocket wheel 64 is located at a height relative to belts 28 and 30 such that when the chains carrying jigs 58 leave the wheel the ends of arms 68 and 70 of the jigs will position the rung tapes 13 and 14 carried thereby the proper distance from the edges of the partially cured side tapes. Sprocket wheel 62 is preferably located lower than sprocket wheel 64 a distance slightly greater than the width of rung tapes 13 and 14 and chain 60 is suitably guided so that as belts 28 and 30 and jigs 58 advance across final curing ovens 54 and 56 and rungs 13 and 14 have become sufficiently attached to side tapes 10 and 11 and jigs are gradually and gently pulled away from the rung tapes so that when a jig passes beyond said final curing ovens it is completely free from the rungs that it had positioned between the side tapes.

The rung tapes 13 and 14 can be loaded on jigs 58 by hand at any time prior to their passing between belts 28 and 30 and the partially cured side tapes. However, any convenient type of loading mechanism can be used to position the rung tapes on the arms of the jig. One type of mechanism that can be used to load jigs 58 is disclosed in Patent No. 2,620,850, issued to me December 9, 1952. This loading mechanism is preferably located so as to load the jigs as they pass around sprocket wheel 62 and it is indicated diagrammatically in Figs. 5 and 6 by the numeral 72.

It is desirable to apply a thin coating of material to the ends of the rung tapes that are to be attached to the side tapes before said rung tapes are positioned between said side tapes. This material can be any composition which will soften the surface of the partially cured side tapes to permit the ends of the rung tapes to partially embed themselves therein to bring about a strong bond between said rung ends and side tapes when the curing of the side tapes is completed. Preferably a thin layer of uncured thermo-plastic plastic similar to that used to form the side tapes is applied to the rung ends. The thin coating of uncured plastic material is applied to the rung ends just before they are positioned between the side tapes. This coating can be applied by hand or in any other convenient manner. However, it is preferred to use a pair of rollers 74 and 76 located adjacent sprocket wheel 64 and spaced apart a distance such that their surfaces are contacted by the rung ends as they pass therebetween. The surfaces of the rollers can be wetted by the uncured plastic in any convenient manner, for example, by having a portion of their periphery immersed in a supply of the liquid plastic.

It will be understood by those skilled in the art that the lengths of ovens 48 and 54 and 56 are such that the time it takes a given point on belts 28 and 30 to pass through oven 48 is equal to the length of time that the plastic material cast thereon must be heated to attain the partly cured condition necessary to support said plastic on said belts and to permit the rung ends to embed themselves a slight amount in the cast tapes while preventing them from sinking so far in that they deform or weaken the side tapes. The length of ovens 54 and 56 is such that the time it takes a given point on belts 28 and 30 to pass thereover is equal to the time the cast side tapes must be heated to the temperature maintained by said ovens to complete the curing of said side tapes. Obviously the length of time required in the two sets of ovens and the temperatures maintained therein will vary with the type plastic employed to form the side tapes. However, it has been found that when a plastisol as above described is employed a satisfactory state of partial cure is obtained by heating the cast side tapes to a temperature of about 160° F. for approximately 3 minutes, and the curing of the plastic is completed by heating the side tapes after the rungs have been inserted therebetween to a temperature in the range of 575° F. to 700° F. for approximately 2 minutes.

After belts 28 and 30 leave ovens 54 and 56 the plastic side tapes 10 and 11 are completely cured and the rungs 13 and 14 are securely bonded thereto. After leaving ovens 54 and 56 belt 28 passes around pulley 78 and belt 30 passes around pulley 80 to strip said belts from the now cured side tapes. After being stripped from belts 28 and 30 the completed Venetian blind ladder tape can be collected in any convenient manner as, for example, by being wound on a take-up roll, or by being permitted to fall in a basket or can from which it is later drawn and packed for sale. After being stripped from the completed ladder tape the belts 28 and 30 pass around pulleys 82 and 84 respectively and over pulleys 86 and 88 which return the belts to pulleys 40 and 42 to start through the cycle again.

A modification of the present invention comprises casting the plastic side tapes in two steps. The fluid thermoplastic plastic material can be cast on the molding surfaces to a thickness equal to substantially one-half the thickness desired in the finished side tape. A plurality of parallel dried stretch resistant cords are then laid on the cast layers of plastic which holds the cords in position thereon. Following this a second layer of plastic is cast on top of the previously cast layer to cover the stretch resistant cords and to build the side tape up to the desired thickness. After the second layer of plastic has been cast the plastic is partially cured as above described and the two tapes are twisted through substantially ninety degrees to bring the exposed surfaces of the cast tapes into face-to-face relation. The remainder of the steps are similar to those in the first described embodiment. That is, fluid plastic material is applied to the ends of rung tapes following which they are inserted between the partially cured side tapes to bend the rung ends back and contact said rung ends with the side tapes whereby they embed themselves slightly therein following which the curing of the side tapes is completed and the completed Venetian blind ladder tape is stripped from the molding surfaces.

That portion of the modification of the present invention which differs from the first described modification is illustrated diagrammatically in Fig. 7. Metallic belts 100 pass around driving pulleys 102 and pass under a first set of metering orifices 104 which deposit a layer of thermo-plastic plastic material 106 on said belts. A plurality of parallel stretch resisting reinforcing cords 110, that can be supplied from a warp or creel as above described, are applied to the surface of the layer of plastic 106. Previous to being applied to the layer of plastic 106 the cords 110 are preferably completely dried, to prevent the formation of steam when the plastic is cured, by passing under heating element 112. After receiving stretch resisting cords 110 belts 100, layer of plastic 106 and said cords pass under a second set of metering orifices 114 which apply a second layer 116 of thermo-plastic plastic on layer 106 and over cords 110. Belts 100 carrying the two layers of plastic and stretch resistant cords then pass into oven 118, which is similar to oven 48, and the remainder of the process is similar to the first described process from that same point on.

The method of manufacturing the Venetian blind ladder tape disclosed in Figs. 3 and 4 differs from the above disclosed embodiments of the invention only in the manner in which the rung ends are attached to the side tapes. In both of the above described embodiments the rung tapes are cut considerably longer than the spacing between the side tapes 10 and 11. For example, the rungs are cut one-quarter to one-half inch longer than the spacing between the side tapes so that from one-eighth to one-quarter inch is available at each end of each rung tape to be bent back and to contact the surface of the side tapes. The large area of the bent over rung ends prevents those ends from sinking into the soft partially cured side tapes more than a slight amount. To manufacture the ladder tape disclosed in Figs. 3 and 4 the rung tapes 18 and 19 are cut to a length only slightly greater than the spacing between the side tapes. The length of rungs 18 and 19 is equal to the space between side tapes 15 and 16 plus the distance it is desired to have the rung ends embedded in said side tapes. Preferably rungs 18 and 19 are embedded into side tapes 15 and 16 a distance substantially equal to the thickness of the layer of plastic over stretch resisting cords 17. It is also desirable to coat the ends of rungs 18 and 19 that are to be embedded in side tapes 15 and 16 with uncured plastic material in the above described manner to improve the bond between the rung ends and the side tapes.

After side tapes 15 and 16 have been cast and partially cured by either of the above described modifications of the present invention rung tapes 18 and 19 are positioned between said side tapes. Jigs 58 can be employed to position rungs 18 and 19 between side tapes 15 and 16. However, it is preferred to position said rungs by bending or bowing them a slight amount to bring their ends sufficiently close together to permit them to move between said side tapes without touching either one. After the rungs are located between the side tapes the bending force is removed permitting the rungs to straighten and force their ends into the side tapes. The relatively small area of the ends contacting the side tapes permit them to sink into the soft partially cured plastic material of said side tapes.

After rungs 18 and 19 have been positioned between side tapes 15 and 16 said side tapes are again heated in the above described manner to finish curing them and to bond the embedded rung ends thereto.

It will be appreciated by those skilled in the art that two color ladder tape can be manufactured by means of the second described modification by casting the first layer 106 from a plastic having one color and casting the second layer 116 from a plastic having a different color.

The hereinabove described processes for making non-self-supporting Venetian blind ladder tape may be carried out employing uncured synthetic resinous plastic compositions known as organosols or plastisols which have been commercially available for many years; and, of which, Example I, hereinabove, is merely representative. These plastisols usually contain, as the synthetic resinous component, delta and gamma polyvinyl chloride and copolymers of vinyl chloride and vinyl acetate which have average molecular weights above 16,000 as determined by Staudinger's method, preferably from 22,000 to 25,000, and vinyl chloride contents between 90 and 97 percent, preferably about 93 percent. Mixtures of polyvinyl chloride and the copolymers of vinyl chloride and vinyl acetate may also be used. Other copolymers suitable for use in this invention are copolymers of vinyl chloride with dibutyl maleate, ethyl acrylate, methyl acrylate, butyl acrylate, methyl methacrylate and butyl methacrylate of the same vinyl chloride content and average molecular weight.

The foregoing resins are combined with plasticizers that are considered high boiling solvents. These include di(2-ethylhexyl) phthalate, tricresyl phosphate, methoxyethyl acetyl ricinoleate, di(butoxyethyl) phthalate, dioctyl phthalate, dioctyl sebacate, butyl phthalyl butyl glycolate and tri(2 ethylhexyl) phosphate. The amounts of resin to plasticizer used range from 35 to 100 parts by weight of plasticizer to 100 parts by weight of plasticizer to 100 parts by weight of resin. The blends of resin and plasticizer may be suspended in blends of aliphatic and aromatic hydrocarbons. The aliphatic hydrocarbons used have boiling ranges of 200° to 300° F. and include heptane, octane, nonane, cyclohexane, methyl cyclohexane, dimethyl cyclopentane, cyclohexene, and methyl cyclohexene. The aromatic hydrocarbons used include benzene, toluene, xylene and commercial hydrogenated petroleum naphthas. About 1 to 2.3 parts of aromatic hydrocarbons are used for each part of aliphatic hydrocarbons. Up to about 60 parts of an active solvent such as n-butyl acetate, acetone, methyl ethyl ketone, or methyl isobutyl ketone may be used for each 100 parts by weight of dry resin to facilitate suspension if low amounts of plasticizer are present. The plastisols may be colored with the usual pigments such as iron oxides (yellow, black or red), carbon black, titanium dioxide, and chromic oxide, the amount thereof employed being widely variable according to the shade or intensity of color desired. In addition, heat and light stabilizers for the resins may be included such as lead stearate, dibutyl tin dilaurate, di-butyl tin laurate maleate and calcium butyl aceto-acetate which are heat stabilizers and phenyl salicylate and coumarin which are light stabilizers.

In addition to the compositions disclosed in Example I, above, which are useful in this invention are the following:

Example II

An opaque, white, non-self-supporting Venetian blind ladder tape may be prepared by the above-described processes wherein the uncured plastic is partially cured prior to rotating the molding surfaces ninety degrees, as described, from the following composition:

| | |
|---|---|
| Gamma polyvinyl chloride | 100.0 |
| Dioctyl adipate | 47.5 |
| Dioctyl sebacate | 47.5 |
| Aluminum stearate | 1.4 |
| Titanium dioxide | 5.0 |
| Dibasic lead phosphite | 3.0 |
| Calcium carbonate | 20.0 |

The above are given in parts by weight.

Example III

A black, non-self-supporting Venetian blind ladder tape may be prepared by this invention from the following uncured plastic composition in which the ingredients, in parts by weight are:

| | |
|---|---|
| Vinyl chloride-vinyl acetate copolymer (95.6% vinyl chloride) | 100.0 |
| Tricresyl phosphate | 13.6 |
| Di(2-ethylhexyl) phthalate | 32.0 |
| Litharge | 3.0 |
| Basic lead carbonate | 6.0 |
| Fused lead stearate | 1.2 |
| Carbon black and mineral oil | 6.4 |
| Xylene | 30.0 |
| Mineral spirits (boiling range 305.5° to 405° F.): | |
| Hydrogenated petroleum naphtha (boiling range 270°–350° F.—93.5% aromatics) | 70.0 |
| Ethylene glycol monethyl ether | 15.3 |

The foregoing compositions are merely typical of the plastisols which may be used in this invention. Numerous other suitable compositions are described in the literature and prior patents; such as, for example, U. S. Patent No. 2,427,513, granted September 16, 1947, to C. I. Spessard, and U. S. Patent No. 2,461,613, granted February 15, 1949, to R. W. Quarles et al.

As stated in the objects of this invention, only the final curing is essential; and this process, according to this invention, may be carried out without partially curing the side tapes. The partial curing step is necessary, when the above-described preferred plastic is employed with the apparatus disclosed in Figs. 5 and 6 to prevent distortion of the cast uncured side tapes and movement of the reinforcing cords when they and their supporting belts are twisted to bring the side tapes into face-to-face relation. It will be clear to those skilled in the art that the fluid uncured plastic material can be cast on the moving belts 28 and 30 while said belts are in face-to-face relation thus eliminating the need for the twisting step and the partial curing step. Furthermore, it is possible to add gelling agents to conventional plastisols of the type set forth above to modify the plastisol into a plastigel, a composition which in its uncured state is resistant to flow. The following gelling agents when added to a plastisol will convert it to a plastigel: metallic soaps such as aluminum stearate and sodium stearate, calcium carbonate, calcium silicate, silica aerogel, carbon black and organophilic bentonite. A plastigel can be cast on the moving belts 28 and 30 of Figs. 5 and 6 or belts 100 of Fig. 7 and the partial curing step can be eliminated inasmuch as the belts carrying the uncured cast plastigel can be twisted without disturbing the plastigel or moving any reinforcing cords that may be incorporated in the cast tapes.

The plastigels which are used in the process and which do not require partial curing prior to rotating the molding surfaces ninety degrees preparatory to inserting the ladder strips are merely blends of synthetic resins such as polyvinyl chloride or copolymers of vinyl chloride and vinyl acetate or mixtures thereof and high boiling solvent plasticizers of the types above-described. Typical examples of compositions which may be used in this invention have the following compositions in parts by weight:

*Example IV*

| | |
|---|---:|
| Gamma polyvinyl chloride | 55 |
| Copolymer vinyl chloride and vinyl acetate (97% vinyl chloride) | 45 |
| Quaternary ammonium modified bentonite (Bentone oil) | 5 |
| Dioctyl phthalate | 35 |
| Polyethylene glycol maleate (average molecular weight 2200) | 35 |
| Dibasic lead phosphite | 3 |
| Carbon black | 0.9 |

*Example V*

| | |
|---|---:|
| Gamma polyvinyl chloride | 100 |
| Dioctyl phthalate | 100 |
| Calcium carbonate | 25 |
| Dibasic lead phosphite | 3 |
| Hydrous aluminum silicate | 160 |

Other examples of plastigels which may be used in lieu of the compositions of Examples IV and V are disclosed in Examples I–III of U. S. Patent No. 2,373,347, granted April 10, 1945, to F. K. Schoenfeld. The foregoing compositions disclosed in Examples IV and V and in the patent of F. K. Schoenfeld have a high viscosity and a viscosity equivalent to that of toothpaste or higher. Such compositions of uncured plastic may be deposited on the molding surfaces; and, when the latter are rotated ninety degrees, these compositions retain their shape and do not flow from the molding surfaces during the interval prior to final curing. The compositions are, however, soft and tacky, and the ladder pieces may be pressed into the surfaces thereof; but, as in the case of the plastisols described in Examples I–III, the plastigels require the support oft he molding surfaces. The plastisols and plastigels are both capable of being fully cured and producing non-self-supporting Venetian blind ladder tapes wherein the ladder elements are integral with the spaced longitudinally extending side tapes.

The present invention has been described in connection with the use of thermo-plastic types of plastic. While it is preferred to employ thermo-plastic plastic in practicing the invention it will be understood by those skilled in the art that fluid material that can be polymerized by means other than, or in addition to, heat can be used.

Since certain changes may be made in the above method without departing from the scope of the invention herein involved, it is intended that all matter contained in the above description or shown in the accompanying drawing shall be interpreted as illustrative and not in a limiting sense.

What is claimed is:

1. The method of making plastic Venetian blind ladders comprising the steps of continuously depositing layers of uncured thermoplastic resinous material upon each of a spaced pair of traveling supporting surfaces to form soft, tacky, non-self-supporting resinous tapes thereupon, bringing said tapes together in face-to-face, spaced, parallel relation and transporting said tapes in the same direction and at the same rate of speed, severing a strip of plastic cross bar stock into individual cross bars and carrying said individual cross bars into the space between said parallel tapes at the same rate of speed and in the same direction of travel as said tapes, pressing the ends of said cross bars into contact with the tacky adjacent surfaces of said parallel, non-self-supporting resinous tapes and curing said tapes and holding said ends of said cross bars in contact therewith until said tapes harden and said ends of said cross bars are bonded thereto.

2. The method of claim 1 which includes the steps of partially curing said soft, tacky, non-self-supporting resinous tapes after depositing said tapes upon said spaced pair of traveling supporting surfaces and finally curing said tapes while holding said ends of said cross bars in contact therewith until said tapes harden and said ends of said cross bars are bonded thereto.

3. The method of claim 2 wherein a plurality of stretch-resisting cords are moved in a path of travel above each of said traveling supporting surfaces at the same rate of speed as said surfaces, thereafter continuously depositing said layers of uncured, thermoplastic resinous material on said traveling surfaces and over said stretch-resisting cords, and producing relative movement of said moving stretch-resisting cords and the traveling supporting surface thereunder with respect to one another to draw said stretch-resisting cords to the center of each of said soft, tacky, non-self-supporting resinous tapes.

4. The method of claim 3 wherein said moving stretch-resisting cords are heated to dry said cords before said uncured thermoplastic resinous material is deposited thereover.

5. The method of making plastic Venetian blind ladders comprising the steps of continuously depositing first layers of uncured thermoplastic resinous material upon each of a spaced pair of traveling supporting surfaces, moving a plurality of stretch-resisting cords in a path of travel above each of said traveling supporting surfaces at the same rate of speed as said surfaces, continuously depositing second layers of said uncured thermoplastic resinous material upon each of said first layers and over said moving stretch-resisting cords to form soft, tacky, non-self-supporting resinous tapes having stretch-resisting cords embedded therein, bringing said tapes together in face-to-face, spaced, parallel relation and transporting said tapes in the same direction and at the same rate of speed, severing a strip of plastic cross bar stock into individual cross bars and carrying said individual cross bars into the space between said parallel tapes at the same rate of speed and in the same direction of travel as said tapes, pressing the ends of said cross bars into contact with the tacky adjacent surfaces of said parallel, non-self-supporting resinous tapes and curing said tapes and holding said ends of said cross bars in contact therewith until said tapes harden and said ends of said cross bars are bonded thereto.

6. The method of claim 5 which includes the steps of partially curing said soft, tacky, non-self-supporting resinous tapes having stretch resisting cords embedded therein after depositing said tapes upon said spaced pair of traveling supporting surfaces, and finally curing said tapes while holding said ends of said cross bars in contact therewith until said tapes harden and said cross bars are bonded thereto.

7. The method of making plastic Venetian blind ladders comprising the steps of continuously depositing layers of uncured thermoplastic resinous material upon each of a spaced pair of traveling supporting surfaces lying in the same plane to form soft, tacky, non-self-supportable resinous tapes thereupon, rotating said supporting surfaces to bring said tapes together in face-to-face, spaced parallel relation and transporting said tapes in the same direction and at the same rate of speed, severing a strip of plastic cross bar stock into individual cross bars and carrying said individual cross bars into the space between said parallel, soft, non-self-supporting tapes at the same rate of speed and in the same direction of travel as said tapes, pressing the ends of said cross bars into contact with the tacky, adjacent surfaces of said parallel, soft, non-self-supporting resinous tapes, and curing said tapes and holding said ends of said cross bars in contact therewith until said tapes harden and said ends of said cross bars are bonded thereto.

8. The method of claim 7 which includes the steps of partially curing said soft, tacky, non-self-supporting resinous tapes after depositing said tapes upon said spaced pair of traveling supporting surfaces lying in the same plane, and finally curing said tapes while holding said ends of said cross bars in contact therewith until said tapes harden and said cross bars are bonded thereto.

No references cited.